Nov. 14, 1933.                S. L. ADELSON                1,934,759
                           RATE OF FLOW CONTROLLER
                              Filed June 15, 1929
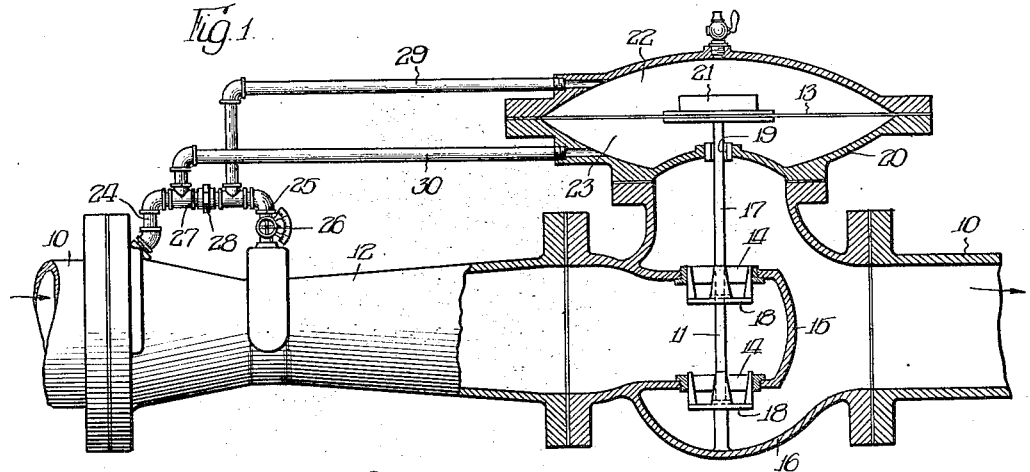
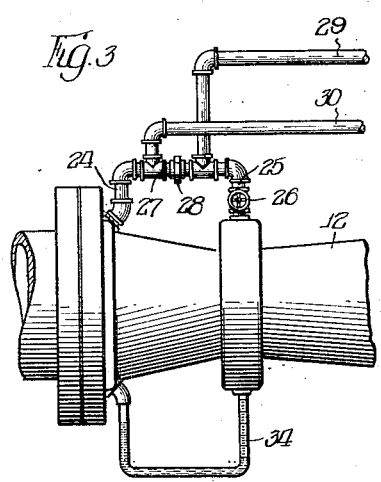
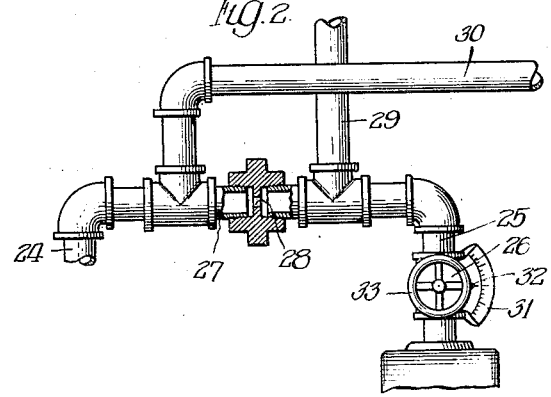
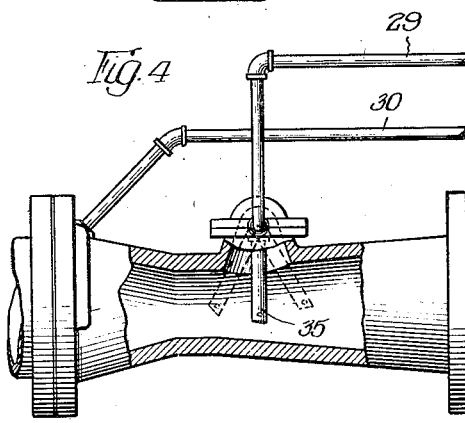
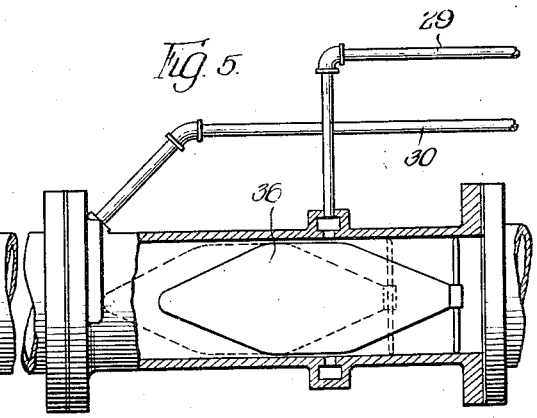
Inventor:
Samuel L. Adelson Patented Nov. 14, 1933

1,934,759

UNITED STATES PATENT OFFICE 1,934,759

RATE OF FLOW CONTROLLER

Samuel L. Adelson, Chicago, Ill., assignor to General Zeolite Company, Chicago, Ill., a corporation of Illinois Application June 15, 1929. Serial No. 371,231

13 Claims. (Cl. 137—152.5)

The present invention pertains to rate of flow controllers of the type in which the differential pressure obtained from a Venturi tube or orifice positioned in the line of flow is employed to control the operation of a regulating valve in such line.

In filtration plants, where rate of flow controllers are commonly used to regulate the flow of water from the filter beds, there is a distinct need for a rate of flow controller which will respond to small variations in the rate when the rate is low. The rate of flow controllers heretofore used in such plants have been sufficiently sensitive to small variations in the rate when the rate is high but not when the rate is low.

The invention comprises both a new method of utilizing or applying a differential created in the conduit by the flow, and a novel apparatus. Heretofore in such apparatus the varying differential created by different rates of flow has been applied to a diaphragm and counterbalanced by a movable counterweight, which counterweight was adapted to be moved along the beam to provide the proper moment to offset the thrust of the diaphragm and thus set or hold the flow to the desired rate. In accordance with the present invention, the differential created by the Venturi tube or orifice necessarily varies with the rate of flow, but this differential is modified before reaching the diaphragm, while the weight applied to the diaphragm is constant. Instead of shifting a counterweight to set the flow to different rates, thus balancing the new thrust of the diaphragm, the modifying means is re-set so as to require a change in the flow through the Venturi tube and a change in the differential pressure created, in order that the thrust of the diaphragm will equal the weight.

The principal object of the invention is to provide a novel rate of flow controller which is equally sensitive to small variations in the rate when the rate is low as well as when it is high.

Another important object is to provide a novel rate of flow controller in which friction is reduced to a minimum, and in which all of the moving parts, of which there are but a very few, are entirely enclosed.

Another important object is to provide a novel rate of flow controller which is characterized by a high degree of accuracy throughout its operating range, is simple in construction, is dependable in operation, and is free from the objectionable stuffing boxes, pivoted levers, heavy counterweights, and the like, characteristic of the ordinary rate of flow controller of the type under consideration.

Still other objects and advantages of the invention will be evident to those skilled in the art upon a full understanding of the construction, arrangement and operation of the improved controller.

Three different forms of the invention are presented herein for the purpose of exemplification, but it will of course be appreciated that the invention is susceptible of embodiment in other structurally modified forms coming equally within the comprehensive scope of the appended claims.

In the accompanying drawing:

Fig. 1 is a partially sectioned side view of a rate of flow controller constructed in accordance with the invention;

Fig. 2 is a fragmentary side view, showing in more detail a portion of the controller illustrated in Fig. 1;

Fig. 3 is a fragmentary side view corresponding to a portion of Fig. 1, showing a modification of the rate-setting device;

Fig. 4 is a partially sectioned fragmentary side view of a modification of the Venturi tube; and Fig. 5 is a partially sectioned fragmentary side view of another modification of the Venturi tube.

The rate of flow controller shown in Figs. 1 and 2 is positioned in a conduit 10, and includes a balanced valve 11, a Venturi tube 12 and a pressure diaphragm 13. The diaphragm is connected up with the Venturi tube and the valve in such a way as to move the valve when a change occurs in the differential pressure produced by the Venturi tube.

The valve 11 consists of two spaced seats 14 which are formed in a web 15 of a casing 16, a reciprocating stem 17 which passes through the openings in the seats, and two spaced disks 18 which are mounted on the stem 17 for coaction with the seats 14. The stem 17 extends upwardly through an aperture 19 in a casing 20 which is mounted on top of the casing 16, and the upper end of the stem is connected to the center of the diaphragm 13 and carries a weight 21. The diaphragm 13 divides the casing 20 into a low pressure chamber 22 and a high pressure chamber 23.

The Venturi tube 12, which may be of ordinary construction, is provided in the upstream portion thereof with a high pressure take-off pipe 24 and in the throat portion thereof with a low pressure take-off pipe 25. The pipe 25 contains a hand-operated valve 26, which is used in the manner hereinafter described to set the rate of flow, and the pipes 24 and 25 are connected by a pipe 27 which contains a constriction 28. A pipe 29 connects the low pressure chamber 22 in the casing 20 with the pipe 27 at a point between the valve 26 and the constriction 28, and a pipe 30 connects the high pressure chamber 23 in the casing 20 with the pipe 27 at a point on the high pressure side of the constriction 28. A scale 31 showing different rates of flow is positioned adjacent the valve 26, and a pointer 32 is mounted on the handle 33 of the valve in such position as to indicate on the scale the rate of flow which will occur when the handle is in any particular position.

The above described rate of flow controller is designed to operate with the same pressure differential on the diaphragm regardless of whether the flow through the conduit is high or low. A flow through the conduit 10 and Venturi tube 12 creates a lower pressure on the throat and thus causes a flow through the pipes 24 and 27, constriction 28 and pipe 25. The pressure on one side of the constriction 28 is communicated through the pipe 30 to the chamber 23, and the pressure on the other side of the constriction 28 reaches the chamber 22 through the pipe 29. The pressure in the pipes 24 and 30 is always that existing at the full section of the Venturi tube. With the rate-setting valve 26 wide open the pressure in the pipes 25 and 29 will be that existing at the throat of the Venturi tube, and, with the valve 26 fully closed, the pressure in these pipes will be equalized with that in the pipe 24 through the orifice 28. With the valve 26 in a partly open position, the pressure in the pipes 25 and 29 will be between that in the pipe 24 and the throat pressure.

The weight 21 plus the weight of the moving parts is such as to counterbalance the pressure differential present on the diaphragm when the rate-setting valve 26 is nearly open and the rate of flow through the conduit 10 is as low as the controller is built for. Should any change occur in the rate of flow when the controller is set for the minimum rate, the resulting change in the pressure differential in the pipe 27 on opposite sides of the constriction 28 would be immediately transmitted to the diaphragm 13 and would cause the regulating valve 11 to move in such a way as to rectify the rate of flow. To set the controller to maintain a higher rate of flow, it is merely necessary to close down the valve 26 until the pointer on the handle of the valve indicates on the scale the desired rate of flow, the scale of course being properly calibrated, whereupon the pressure differential on the opposite sides of the constriction 28 will be reduced and the diaphragm 13 will move to open the valve 11 until the rate of flow in the conduit reaches the desired amount, at which time the pressure differential will have increased sufficiently to again counterbalance the weight 21. Thereafter, the valve 11 will be operated automatically in precisely the same manner as before to compensate within narrow limits for any fluctuation in the rate of flow through the conduit.

Instead of the scale 31 and pointer 32 being employed to indicate the rate of flow through the conduit 10 for any particular setting of the valve 26, a U-shaped tube 34 may be used, as shown in Fig. 3. The ends of the tube 34 are connected respectively with the upstream and throat portions of the Venturi tube, and the pressure differential between such portions is impressed upon a column of mercury in the tube. One or both of the upright portions of the tube may be calibrated to indicate different rates of flow through the conduit 10, and, in setting the controller for any particular rate of flow, it is merely necessary to turn the valve 26 into a position wherein the top of the mercury in the calibrated portion of the tube 34 levels up with the mark on the tube indicating the desired rate of flow.

From the foregoing, it will be appreciated that one of the distinctive features of the rate of flow controller of the invention is the provision of means for enabling a constant pressure differential to be employed on the diaphragm to operate the regulating valve regardless of whether the rate of flow through the conduit controlled by the valve be high or low, which feature makes the controller as sensitive to small changes in the rate of flow when the rate is low as when it is high.

In Fig. 4 is shown a modification of the Venturi tube portion of the controller. The low and high pressure pipes 29 and 30, which communicate with the chambers on the opposite sides of the diaphragm, lead directly into the Venturi tube, the high pressure pipe 30 communicating with the upstream portion of the tube and the low pressure pipe 29 communicating with a swiveled pipe 35 which enters the throat portion of the tube through a suitably packed gland. The pipe 35, which is closed at its lower end and is provided with openings in its side, may be swung by means of a handle (not shown) from the position shown in full lines in Fig. 4 into either of the extreme positions shown in dotted lines in that view. When the pipe 35 is swung to the left into the narrowest portion of the throat, a greater pressure differential obviously will be obtained than when it is swung to the right into a wider portion of the throat. In order to set the controller to maintain a low rate of flow through the conduit 10, the pipe 35 is swung to the left, and, in order to set it for a high rate of flow, the pipe 35 is swung to the right, thereby producing the same pressure differential on opposite sides of the diaphragm for the high rate of flow as for the low rate of flow.

In Fig. 5 is shown another modification of the Venturi tube portion of the controller. The low pressure and high pressure pipes 29 and 30 are connected at longitudinally spaced points with the Venturi tube, which tube, in this particular form, is of uniform cross-section. A longitudinally shiftable member 36 which is conically shaped at both ends is arranged centrally within the tube in such a position as to reduce the effective cross-sectional area of the tube adjacent the point of communication with the low pressure pipe 29. When the member 36 is in the full line position shown in Fig. 5, the maximum pressure differential in the pipes 29 and 30 is obtained, and the member 36 is therefore set in that position for a low rate of flow. When a higher rate of flow is desired, the member 36 is shifted forwardly by means of an exteriorly arranged handle (not shown) into the dotted line position shown, with the result that, notwithstanding the increased rate of flow, the pressure differential applied on the diaphragm is the same as it was with the low rate of flow.

I claim:

1. In an automatic rate of flow controller, a Venturi tube, means for controlling the rate of flow through the tube, a diaphragm for operating said control means, connections between the Venturi tube and the diaphragm for transmitting a pressure differential to the diaphragm, means operable independently of the flow for varying the proportion of the Venturi differential effective on the diaphragm, and means for counterbalancing the pressure differential.

2. In an automatic rate of flow controller, a conduit, means for controlling the rate of flow through the conduit, a diaphragm for operating said control means, a constriction in the conduit for producing a pressure differential on the diaphragm, means for counterbalancing a predetermined pressure differential on the diaphragm, manually adjustable means operable independently of the flow for varying the proportion of the derived differential effective on the diaphragm, and means for indicating the different rates of flow which will be maintained in the different positions of said adjusting means.

3. In a rate of flow controller, a Venturi tube, means for controlling the rate of flow through the tube, a single diaphragm for operating said control means, connections between the Venturi tube and the diaphragm for transmitting a pressure differential to the diaphragm, positive non-fluctuating control means manually adjustable to vary the pressure on the low pressure side of the diaphragm between the high and low pressures obtainable from the Venturi tube, whereby to render the pressure differential on the diaphragm the same for all rates of flow, and means for counterbalancing the pressure differential.

4. In a rate of flow controller, a conduit, a constant restriction in the conduit, a variable restriction in the conduit, a single pressure responsive device actuated by the differential pressure set up by the constant restriction and adapted to actuate the variable restriction, and positive non-fluctuating control means manually adjustable to vary the pressure on the low pressure side of the pressure responsive device between the high and low pressures obtainable from the constant restriction.

5. In a rate of flow controller, a Venturi tube, means for controlling the rate of flow through the tube, a single diaphragm for operating said control means, connections between the Venturi tube and the diaphragm for transmitting a pressure differential to the diaphragm, positive non-fluctuating control means manually adjustable to vary the pressure on the low pressure side of the diaphragm between the high and low pressures obtainable from the Venturi tube, whereby to provide for the maintenance of different rates of flow with the same pressure differential on the diaphragm, and means for counterbalancing the pressure differential.

6. In an automatic rate of flow controller, a conduit, a valve in the conduit for regulating the rate of flow, a diaphragm connected to the valve, means in the conduit for producing a differential pressure, means for applying said differential pressure to said diaphragm, means operable independently of the flow for varying the proportion of the derived differential effective on the diaphragm and means for counterbalancing the applied differential pressure.

7. A fluid flow controller adapted to maintain a predetermined rate of flow and comprising in combination a conduit, means for creating at two points in said conduit fluid pressures whose difference is proportional to the rate of flow, a regulating valve upon said conduit, a diaphragm joined to said valve to impart its motion thereto, a by-pass joining said two points of differing pressures, a constant restriction in said by-pass, a conduit joining said by-pass on one side of said restriction to one side of said diaphragm, a second conduit joining said by-pass on the other side of said restriction to the other side of said diaphragm.

8. A device as described in claim 7 including an adjustable restriction on said by-pass.

9. A fluid flow controller adapted to maintain a predetermined rate of flow and comprising in combination a conduit for the flow, means for obtaining from the flow two pressures whose difference is a function of the rate of flow, a regulating valve on the conduit, a diaphragm joined to said valve to impart its motion thereto, a conduit through which the higher of said pressures may be applied to one side of said diaphragm, another conduit through which the lower of said pressures may be applied to the other side of said diaphragm and a by-pass joining said two conduits.

10. A fluid flow controller comprising a Venturi tube for the main flow, a regulating valve, a pressure responsive device for controlling the positioning of said valve, conduits joining two points of differing pressures on said tube to said device, a restricted by-pass between said conduits, said conduits and said by-pass affording a passage for flow between said points on said tube, and an adjustable restriction on one of said conduits.

11. In a rate of flow controller, a main conduit, a device therein for deriving a pressure differential from the flow through said conduit, a regulating valve on said conduit, a pressure responsive device utilizing a portion only of the derived differential for determining the positioning of said valve, a conduit joining said pressure differential deriving device and said responsive device to transmit pressure from the one to the other and an adjustable device on said second named conduit unresponsive to the flow through the main conduit for consuming pressure difference between the derived differential and the utilized portion.

12. In a rate of flow controller, a conduit, means therein for deriving a pressure differential from the flow through said conduit, a regulating valve on said conduit, a pressure responsive device subject to a portion only of said derived differential for repositioning said regulating valve upon a change in the magnitude of said portion, and a device unresponsive to the flow through the main conduit for varying the difference between the employed and the derived differential.

13. A fluid flow controller comprising a Venturi tube for the main flow, a regulating valve, pressure responsive means subject to a part only of the pressure differential derived from said flow through said tube for controlling the positioning of said valve and a device non-responsive to the flow for varying the proportion of the derived differential employed on said pressure responsive means.

SAMUEL L. ADELSON.